(12) United States Patent
Pazdziora

(10) Patent No.: US 10,104,042 B2
(45) Date of Patent: Oct. 16, 2018

(54) SECURITY POLICY MANAGEMENT (71) Applicant: Red Hat, Inc., Raleigh, NC (US)

(72) Inventor: Jan Pazdziora, Brno (CV)

(73) Assignee: RED HAT, INC., Raleigh, NC (US)

( * ) Notice: Subject to any disclaimer, the term of this patent is extended or adjusted under 35 U.S.C. 154(b) by 227 days.

(21) Appl. No.: 14/606,126

(22) Filed: Jan. 27, 2015

(65) Prior Publication Data
US 2016/0217286 A1 Jul. 28, 2016

(51) Int. Cl.
*G06F 21/57* (2013.01)
*H04L 29/06* (2006.01)
*G06F 21/34* (2013.01)

(52) U.S. Cl.
CPC .......... *H04L 63/0263* (2013.01); *G06F 21/57* (2013.01); *H04L 63/20* (2013.01); *G06F 21/34* (2013.01)

(58) Field of Classification Search
CPC ...... G06F 21/57; H04L 63/20; H04L 63/0263
See application file for complete search history.

(56) References Cited

U.S. PATENT DOCUMENTS

| | | | |
|---|---|---|---|
| 6,226,745 B1 * | 5/2001 | Wiederhold | G06F 21/6218 707/999.009 |
| 7,617,501 B2 | 11/2009 | Peterson et al. | |
| 8,140,664 B2 | 3/2012 | Huang et al. | |
| 8,332,909 B2 | 12/2012 | Chatterjee et al. | |
| 8,505,069 B1 | 8/2013 | Solodovnikov et al. | |
| 2007/0156670 A1 * | 7/2007 | Lim | G06F 21/6218 |
| 2008/0271135 A1 * | 10/2008 | Krell | H04L 63/0263 726/14 |
| 2008/0301765 A1 * | 12/2008 | Nicol | H04L 41/142 726/1 |
| 2010/0064341 A1 * | 3/2010 | Aldera | H04L 63/102 726/1 |
| 2013/0254831 A1 * | 9/2013 | Roach | H04L 63/107 726/1 |

(Continued)

OTHER PUBLICATIONS

Bill McCarty. "SELinux" Published Oct. 11, 2004, © 2005 O'Reilly Media Inc. Excerpts from Chapters 2, 4, & 9 (pp. 19-24, 90-97, 169-204).*

(Continued)

*Primary Examiner* — Joseph P Hirl
*Assistant Examiner* — Thomas Gyorfi
(74) *Attorney, Agent, or Firm* — Haynes and Boone, LLP (57) ABSTRACT

A method performed by a computing system includes, with a computing system, receiving an application and a security policy corresponding to the application, the security policy for use with a security enforcement mechanism, with the computing system, receiving a data structure associated with the application and the security policy, wherein the data structure associates a logged denial by the security enforcement mechanism with a rule of the security policy, wherein the data structure further associates the logged denial with a test for the rule, the test to determine if the rule prevents the denial, with the computing system, applying the test using a temporary security policy, the temporary security policy having the rule removed, and with the computing system, in response to determining that the applying does not result in a denial corresponding to the logged denial, flagging the data structure.

20 Claims, 5 Drawing Sheets

(56) References Cited

U.S. PATENT DOCUMENTS

| | | |
|---|---|---|
| 2013/0298117 A1 | 11/2013 | Reynolds |
| 2014/0189783 A1 | 7/2014 | Kapoor et al. |
| 2014/0282853 A1 | 9/2014 | Velammal et al. |
| 2014/0282855 A1* | 9/2014 | Clark .................. H04L 63/20 726/1 |
| 2015/0332043 A1* | 11/2015 | Russello ................ G06F 11/30 726/23 |

OTHER PUBLICATIONS

"HowTos/SELinux—CentOS Wiki" article last edited Apr. 17, 2012 (10 pages) http://web.archive.org/web/20121003153026/http://wiki.centos.org/HowTos/SELinux.*

SELinux/audit2why man page, Revision dated May 24, 2008 (1 page) https://fedoraprojectorg/w/index.php?title=SELinux/audit2why&oldid=18553&printable=yes.*

SELinux/audit2allow man page, Revision dated May 24, 2008 (2 pages) https://fedoraproject.org/w/index.php?title=SELinux/audit2allow&oldid=1689&printable=yes.*

Dan Walsh. "Using audit2allow to build policy modules. Revisited" article + comments dated Jun. 2011 (4 pages) http://danwalsh.livejournal.com/24750.html.*

Kevin Fenzi. "Tuning Your SELinux Policy with Audit2allow" article dated Jun. 23, 2005 (10 pages) http://www.drdobbs.com/tuningyourselinuxpolicywithaudit2al/199102088.*

Yves le Traon et al. "Testing security policies: going beyond functional testing" 18$^{th}$ IEEE International Symposium on Software Reliability Engineering, © 2007 IEEE (pp. 93-102).*

"Kaspersky Endpoint Security 8 for Windows (for Workstations)" http://support.kaspersky.com/8535, May 28, 2013.

"Host Checker" Juniper Networks, Inc., http://www.juniper.net/techpubs/software/ive/guides/howtos/How_To_Host_Checker.pdf.

* cited by examiner

SECURITY POLICY MANAGEMENT

BACKGROUND

The present disclosure relates generally to software security, and more particularly to methods and systems for managing security policies associated with software applications.

Computing systems use various security mechanisms to ensure that certain pieces of data can only be operated on in certain ways by certain applications. A computing system is typically managed by an operating system such as Linux. The operating system includes a kernel that controls access to computing resources. In some cases, the operating system may include additional security enforcement mechanisms.

One example of an additional security enforcement mechanism is found within Security-Enhanced Linux (SELinux). SELinux provides an additional level of security by disallowing operations unless they are explicitly allowed by a security policy that accompanies a particular application. The security policy for the application can be created during development of the application. Specifically, as code is added to perform various operations on various types of data, an "allow rule" is added to the security policy that tells the SELinux enforcement mechanism that the application is allowed to perform specific operations on specific types of data.

When an application is executed and attempts to perform a particular operation, the security enforcement mechanism within SELinux checks the accompanying security policy to make sure the application is allowed to perform that operation. If so, then the operation is allowed. If not, then a denial of that operation occurs. In the case of SELinux, the denial is an Access Vector Cache (AVC) denial, which gets logged. It is desirable that the security policies for various applications are appropriately managed.

SUMMARY

According to one example, a method performed by a computing system includes, with a computing system, receiving an application and a security policy corresponding to the application, the security policy for use with a security enforcement mechanism, with the computing system, receiving a data structure associated with the application and the security policy, wherein the data structure associates a logged denial by the security enforcement mechanism with a rule of the security policy, wherein the data structure further associates the logged denial with a test for the rule, the test to determine if the rule prevents the denial, with the computing system, applying the test using a temporary security policy, the temporary security policy having the rule removed, and with the computing system, in response to determining that the applying does not result in a denial corresponding to the logged denial, flagging the data structure.

According to one example, a method performed by a computing system includes, with a computing system, receiving an application and a security policy corresponding to the application, the security policy for use with a security enforcement mechanism, with the computing system, receiving a data structure associated with the application and the security policy, wherein the data structure associates a logged denial by the security enforcement mechanism with a rule of the security policy, wherein the data structure further associates the logged denial with a test for the rule, the test to determine if the rule prevents the denial, with the computing system, applying the test using a temporary security policy, the temporary security policy having the rule removed, and with the computing system, in response to determining that the applying does not result in a denial corresponding to the logged denial, flagging the data structure.

According to one example, a method performed by a computing system includes, with a computing system, during a testing phase for development of an application, running the application with a security policy on a system that uses a security enforcement mechanism, with the computing system, in response to determining that the application causes a denial, creating a data structure that associates the denial with the rule intended to prevent the denial and a test used to determine if the rule prevents the denial, with the computing system, after the testing phase, applying the test using a temporary security policy, the temporary security policy having the rule disabled, and with the computing system, in response to determining that the applying does not result in a new denial corresponding to the denial, flagging the information within the data structure.

BRIEF DESCRIPTION OF THE DRAWINGS

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, when using security enforcement mechanisms such as those found in SELinux, an application is accompanied by a security policy. During the development of an application, as the code is continually evolving, sometimes a rule gets added to the security policy that is no longer needed in the final application product. For example, during development, a particular process may be programmed into the code. When testing that code produces a denial, an all allow rule for that process may be entered into the policy that prevents that denial. But, at some point during development, that process may be removed, but the rule that allows that process may be inadvertently left in place. As a result, the final security policy for the final application may have unneeded rules. Such unneeded rules may pose an undesirable security risk.

According to principles described herein, a method of security policy lifecycle management is used to remove unnecessary rules. According to one example, during development of an application (or in some cases, after development), a data structure is created that correlates logged denials with the rule that was created to prevent that denial as well as the test used to determine whether the rule successfully prevented the denial. The data structure may include a tuple for each logged denial.

To determine whether a rule is still necessary, for each tuple in the data structure, a temporary security policy is created. The temporary security policy is the same as the original security policy except without the rule of that tuple. Then, the test of that tuple is applied using the temporary security policy. If the test produces a denial, then it can be assumed that the rule of that tuple is still needed. But, if the test does not produce the denial, then that tuple can be flagged for investigation. With further investigation, it may be determined that the rule is no longer needed and can thus be removed.

Figure 1:
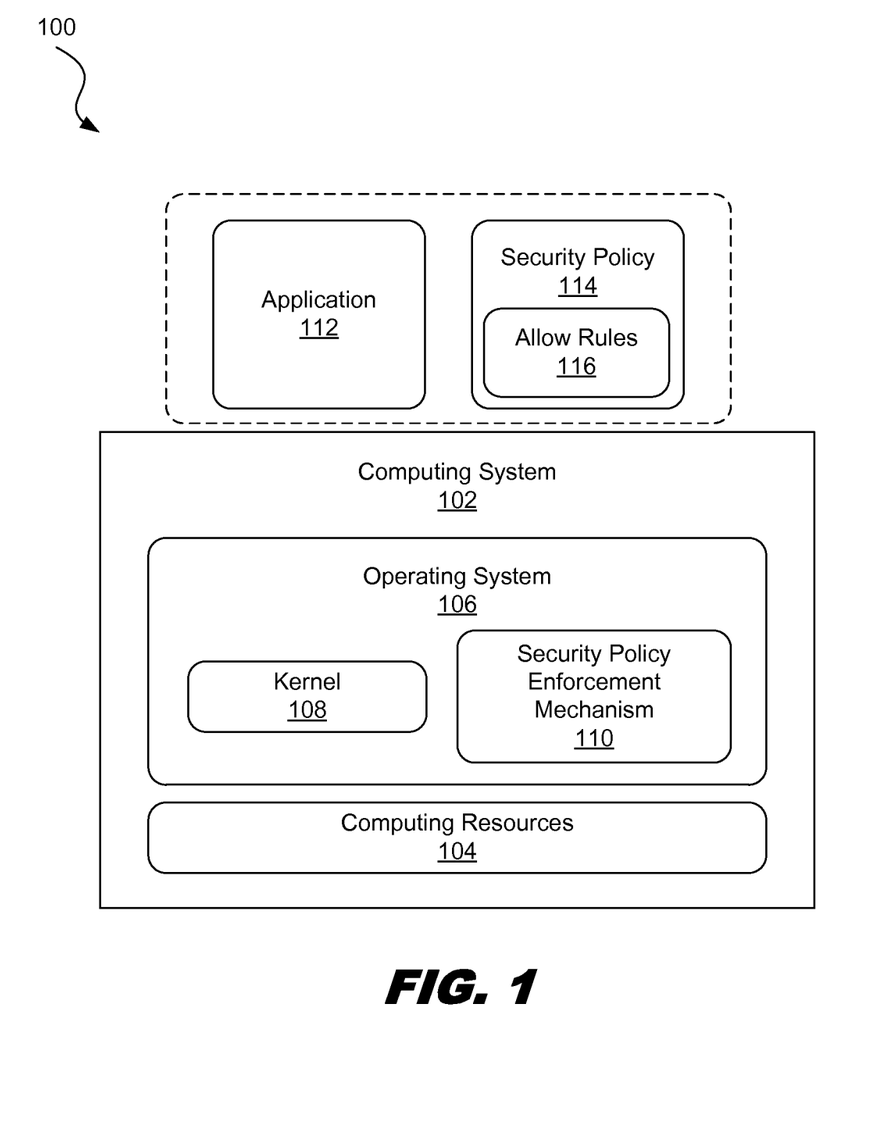
FIG. 1 is a diagram showing illustrative use of a security enforcement mechanism, according to one example of principles described herein.

FIG. 1 is a diagram 100 showing illustrative use of a security enforcement mechanism. According to the present example, a computing system 102 includes computing resources 104 and an operating system 106. The operating system 106 includes a kernel 108 and a security policy enforcement mechanism 110. An application 112 that runs on the computing system is accompanied with a security policy 114 that includes a set of allow rules 116.

The computing system is a physical computing system such as a server. The system thus includes at least one processor, memory, and other hardware resources. More detail on an example of a computing system will be discussed below in the text accompanying FIG. 5

The resources 104 of the processing system include hardware resources such as the processor itself and available memory such as Random Access Memory (RAM) and non-volatile memory storage. The resources 104 may also include network resources and virtualized resources.

The operating system 106 is a piece of software that manages the hardware of the computing system and other resources. The operating system 106 provides processing services to applications running on the computing system 102. The operating system schedules tasks to be processed by the processor. Such tasks include instructions for the applications as well as system management functions associated with the operating system 106.

The kernel 108 is a component of the operating system 106. The kernel provides a basic level of control over the hardware devices of the computing system 102. The kernel 108 manages memory access for programs in RAM and manages the processor operating states for efficient operation. The kernel 108 determines which applications get access to which hardware resources, thus providing a security function. The kernel 108 may work with firmware and device drivers to perform such tasks.

The security enforcement mechanism 110 is an access control security module that may be part of the kernel. In some examples, however, such as in the case of SELinux, thes security enforcement mechanism may be orthogonal to the non-enhanced Unix access control mechanisms. The security enforcement mechanism allows or prohibits various operations with various types of data based on security policies that are associated with specific applications. Particularly, for a specific application, a security policy is created that is used when the application executed on a system that includes the security enforcement mechanism 110. The security policy may be created by the developers of the application or a separate team. One example of such a security enforcement mechanism is SELinux.

The application 112 may be any type of application designed to run on the computing system 102. If the computing system 102 is a server, then the application 112 may be a server based application. The application includes a set of instructions to be performed by the processor of the computing system 102. The instructions cause the processor to perform a variety of operations on different types of data. Such operations may include read and write operations to specific locations in memory or to perform certain operations on data stored in memory, hard disk space, or network storage.

The security policy 114 accompanies the application. The security policy includes the access control rules (allow rules 116) that when used with the security enforcement mechanism 110, allow the operations performed by the application 112. The security policy 114 may be created along with development of the application. In some cases, however, the security policy is created after the application is complete.

Figure 2:
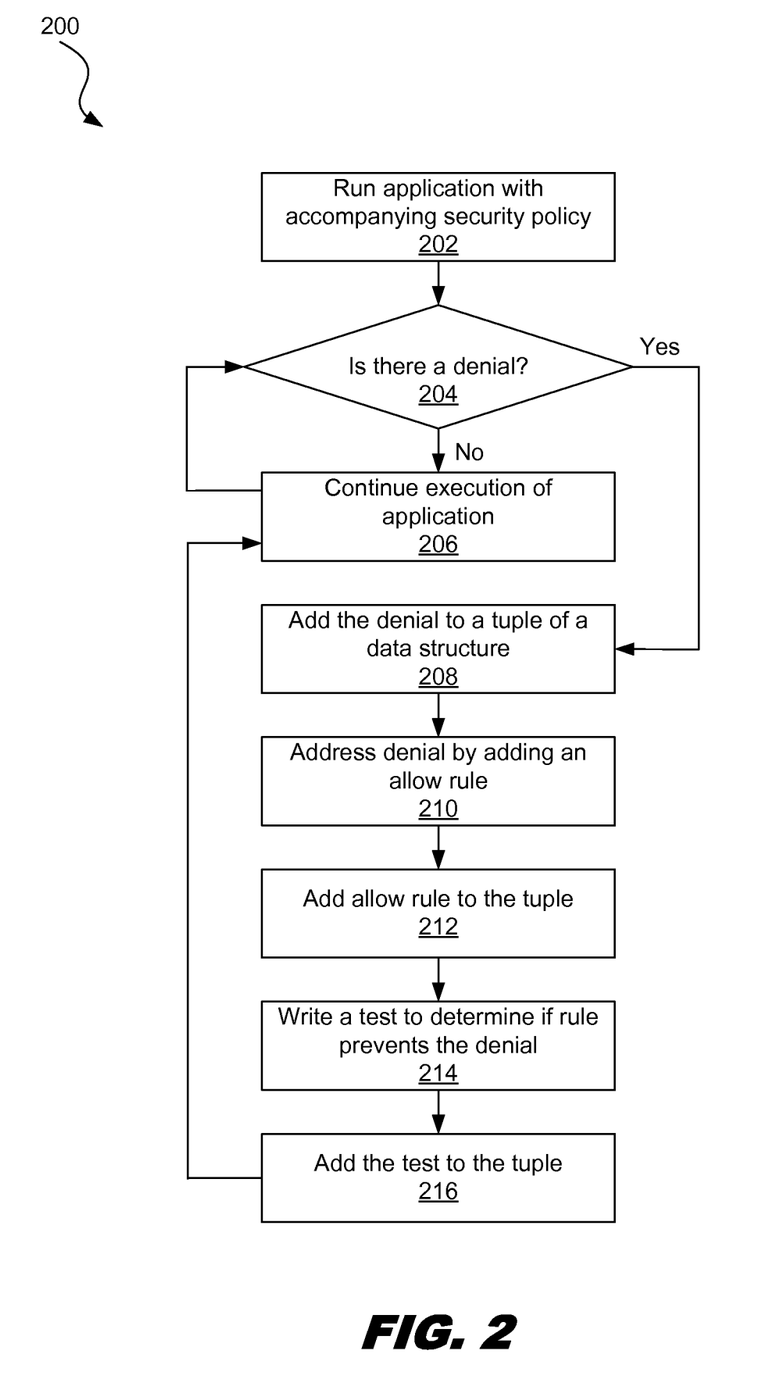
FIG. 2 is a flowchart showing an illustrative method for creating a data structure used in managing a security policy, according to one example of principles described herein.

FIG. 2 is a flowchart showing an illustrative method for creating a data structure used in managing a security policy. According to the present example, the method 200 includes a step 202 for running an application with its accompanying security policy. At step 204, it is determined whether there has been a denial of a process request. A denial occurs if the application attempts to perform an operation that is not allowed by the security policy. In the case of SELinux, the denial is an AVC denial. Such denials are typically logged.

If there has not been a denial, then the method 200 proceeds to step 206 at which the application continues execution. If, however, it is determined that a denial has occurred, then that denial is added as a tuple in a data structure in step 208. As will be explained in further detail below, the data structure may be a database having three columns: a denial column, a rule column, and a test column. The database may include a tuple (row) for each denial that is detected.

Then, in step 210, a developer or engineer can address the denial by modifying the security policy. This is typically done by adding one or more allow rules, or macros that eventually expand to one or more rules, to the security policy. The added rule or set of rules is designed to prevent the denial that occurred by allowing the operation that was not allowed by the security policy and thus caused the denial. At step 212, the added rule or set of rules is added to the tuple of the associated denial in the rule column.

At step 214, a test is written to determine whether the added rule or set of rules effectively prevents the denial. The test may be a script or other application that provides the application with the appropriate inputs to cause the application to execute the code associated with the operation that caused the denial. Thus, by applying the test with the revised security policy, it can be determined whether the added rule or set of rules allows the operation that previously caused the denial. At step 216, the test is added to the tuple in the test column.

After the test is added to the tuple, the method returns to step 206 at which execution of the application continues. Execution can continue until another denial is detected. The method 200 of FIG. 2 can be performed iteratively during development of the application. For reasons described above, it is possible that the data structure will include tuples corresponding to rules that are no longer needed. Thus, when development of the application is complete, an analysis of the information within the data structure can be performed to determine if any of the rules within the tuples are no longer needed.

In some cases, the data structure is not formed during development of the application. For example, an entity that possesses the application (and the source code for the application) may not necessarily have been the entity that developed the application. Instead, the entity that has possession may have only the application and the security policy. From this information, however, the data structure can be constructed.

According to one example, for each rule in the security policy, a test can be created to test whether that rule prevents the denial. In some cases, such tests may be available through open source licenses as such tests may have been used by the entity that developed the application originally. Thus, the tuple can be created using the rules of the policy and the corresponding tests.

In some cases, there may be a significant number of rules within a policy and thus it can be time consuming to create tests for each of such rules. Thus, the creation of the tuples can be prioritized by types of rules. Some types of rules pose greater security risks than other rules. For example, write access rules pose a greater risk than append access rules. Append access rules can pose a greater risk than read access rules. Read access rules can pose a greater risk than directory listing access rules. Reading a cert_t file can pose a greater risk than reading a usr_t file. Thus, when the developer proceeds through the rules of the existing security policy to create tests or find tests for such rules, he or she can prioritize by rule type. In some examples, the computing system may perform an analysis on the security policy and recommend the rules that pose the most risk.

Figure 3:
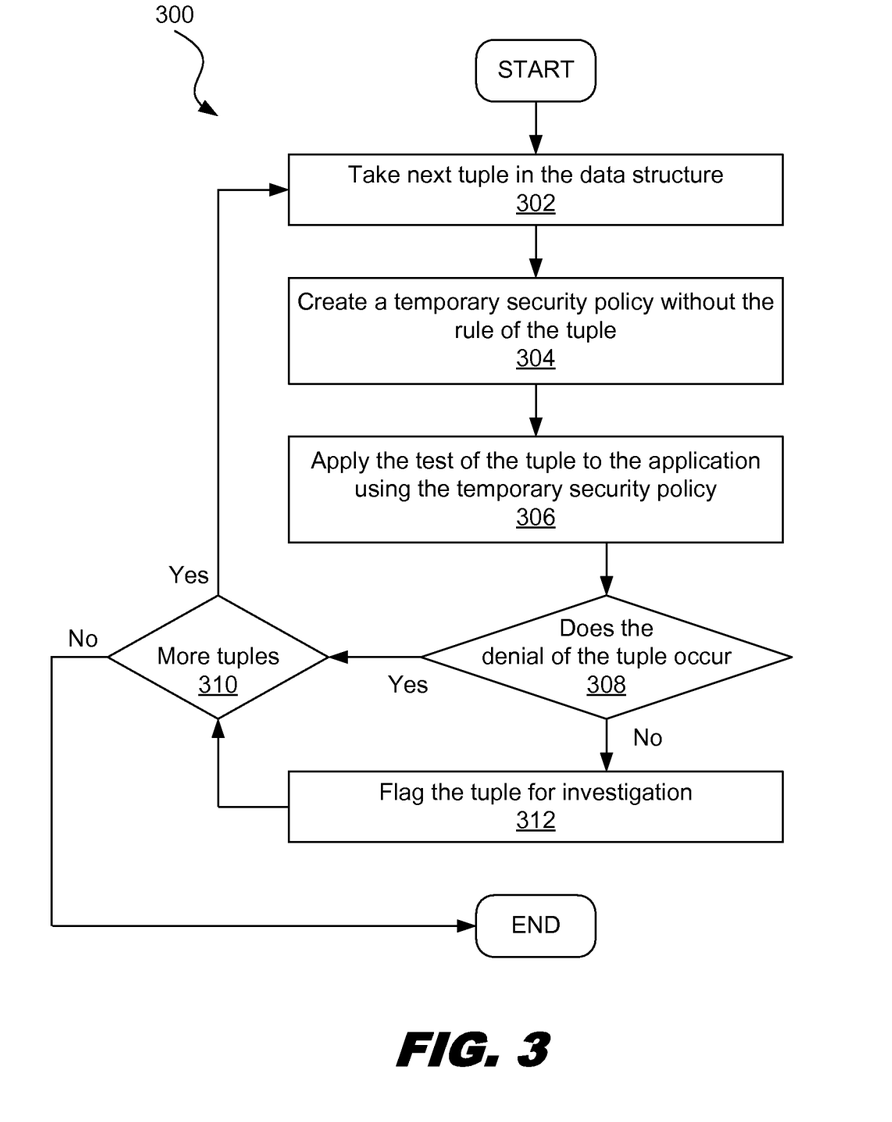
FIG. 3 is a flowchart showing an illustrative method for using the data structure to eliminate unnecessary rules from a security policy, according to one example of principles described herein.

FIG. 3 is a flowchart showing an illustrative method for using the data structure to eliminate unnecessary rules from a security policy. According to the present example, the method starts at step 302, at which the next tuple is taken from the data structure. In the first iteration, the first tuple is taken from the data structure. The tuple currently being considered will be referred to as the current tuple.

The method 300 includes a step 304 for creating a temporary security policy. The temporary security policy is the same as the original security policy except that the rule or set of rules of the current tuple is removed. In other words, the rule or set of rules in the rule column of the tuple is removed from the security policy to create the temporary security policy.

The method 300 further includes a step for applying the test of the tuple to the application using the temporary security policy. As described above, the test in the test column for the tuple corresponds to the test used to determine whether the rule or set of rules of the rule column prevents a denial by allowing the appropriate operation to continue. This test is then applied to the application. But, instead of using the original security policy, the temporary security policy is used.

At step 308, it is determined whether application of the test with the temporary security policy causes a denial. Presumably, if the rule or set of rules were still needed, the application with the temporary security policy would then cause the same denial of the tuple. Thus, if the denial occurs, then the method proceeds to step 310. But, if no denial occurs, then the method proceeds to step 312.

At step 312, the tuple is flagged for investigation. After the tuple is flagged for investigation, the method 300 proceeds to step 310. It may be the case that because the denial did not occur without the rule or set of rules, the rule or set of rules is no longer needed. But, the denial may have been absent for other reasons. For example, due to changes in the application, it may be the case that the test no longer adequately determines whether the rule or set of rules is needed. In such a case, during investigation, the test can be verified. Specifically, an analysis is performed to determine whether the test still adequately tests that rule or set of rules. If not, then the test can be revised. The revised test can then be used to determine whether absence of the rule or set of rules causes the denial.

If, after investigation, it is determined that the rule or set of rules is no longer needed, that rule or set of rules can be permanently removed from the security policy. The security policy for the application then has one less rule or set of rules that is unnecessary and thus has reduced security vulnerability.

In some cases, a tuple that is flagged for investigation can be submitted as a ticket in a community based bug resolution mechanism. One example of such a bugtracker is Bugzilla. This approach may be beneficial in the case where the entity that performs the investigation is not associated with the entity that created the application. For example, many pieces of software are created with open source licenses.

At step 310, it is determined whether there are more tuples in the database. If there are no more tuples in the data structure, then the method 300 ends. But, if there are more tuples in the data structure, then the method returns to step 302, at which the next tuple is taken from the data structure. The process described above is then performed on that next tuple.

Figure 4:
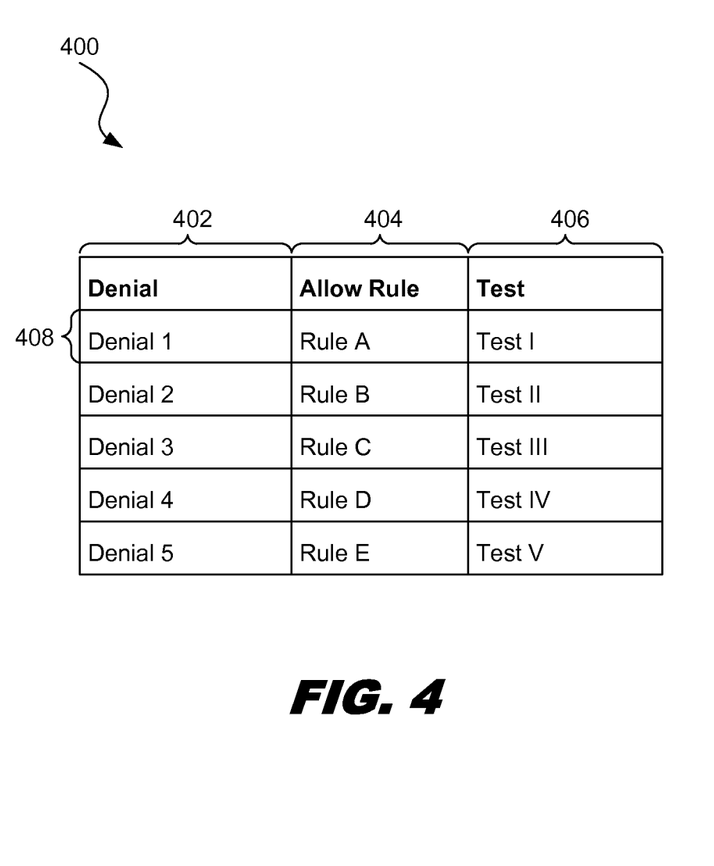
FIG. 4 is a diagram showing an illustrative data structure used for managing a security policy, according to one example of principles described herein.

FIG. 4 is a diagram showing an illustrative data structure 400 used for managing a security policy. According to the present example, the data structure 400 is a database with a set of rows, referred to as tuples 408, and a set of columns 402, 404, 406. Specifically, there is a denial column 402, an allow rule column 404, and a test column 406.

In the present example, the first tuple 408 corresponds to denial 1. As described above, denials such as AVC denials are typically logged. The denials may be associated with an identification number that uniquely identifies that denial instance. Here, denial 1 is associated with Rule A. Thus, Rule A was used to prevent denial 1 by allowing the appropriate operation to proceed. Moreover, Test I was used to determine whether Rule A effectively prevents a denial similar to Denial 1 from occurring. While the data structure is illustrated in FIG. 4 as a database, other data structures can be used to associate denials with the associated rules and tests.

Figure 5:
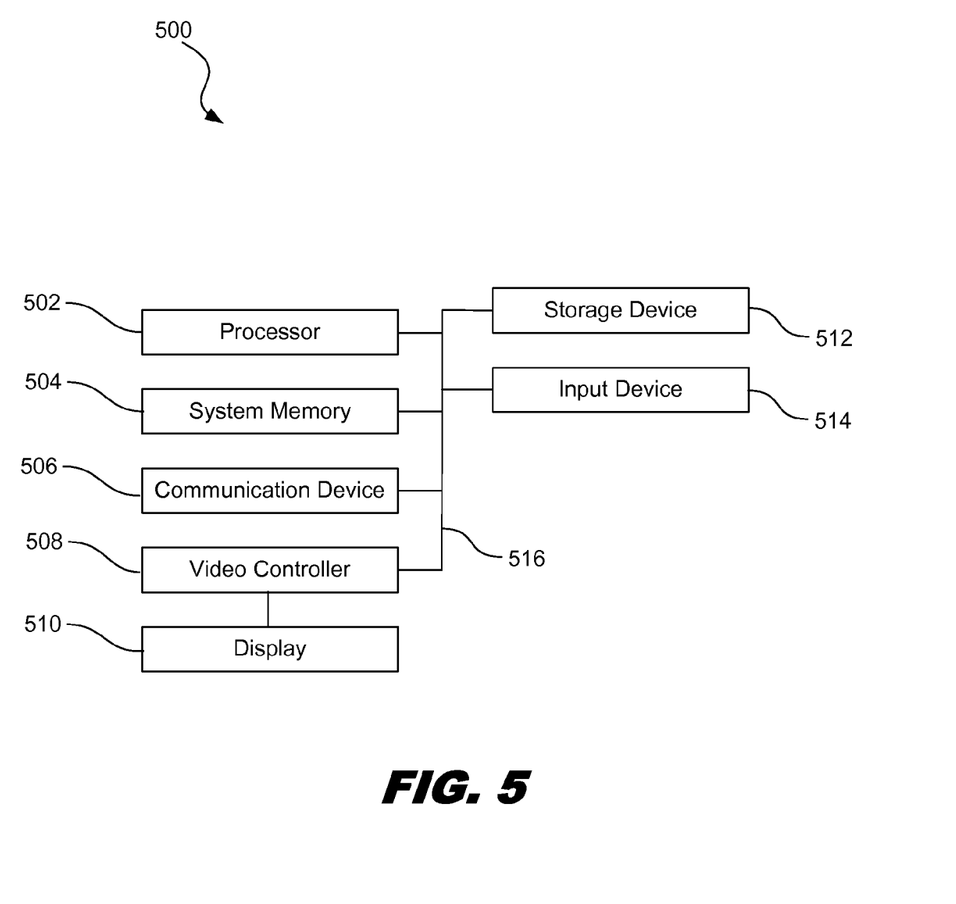
FIG. 5 is a diagram showing an illustrative computing system that may be used to manage a security policy, according to one example of principles described herein.

FIG. 5 is a diagram showing an illustrative computing system 500 that may perform a variety of the functions described herein. For example, the computing system 500 may perform the steps illustrated in FIG. 2 related to creating a data structure. The computing system 500 may also perform the steps illustrated in FIG. 3 related to using the data structure for managing a security policy.

According to the present example, the computing system 500 includes a processor 502, an input device 514, a storage device 512, a video controller 508, a system memory 504, a display 510, and a communication device 506, all of which are interconnected by one or more buses 516.

The storage device 512 may include a computer readable medium that can store data. The storage device 512 may include volatile memory storage devices such as Random Access Memory (RAM) as well as non-volatile memory storage devices such as solid state memory components. The computer readable medium may be a non-transitory tangible media.

In some examples, the communication device 506 may include a modem, network card, or any other device to enable the computing system 500 to communicate with other computing devices. In some examples, any computing device represents a plurality of interconnected (whether by intranet or Internet) computer systems, including without limitation, personal computers, mainframes, PDAs, smartphones and cell phones.

A computing system such as the computing system 500 typically includes at least hardware capable of executing machine readable instructions, as well as the software for executing acts (typically machine-readable instructions) that produce a desired result. In some examples, a computing system may include hybrids of hardware and software, as well as computer sub-systems.

In some examples, hardware generally includes at least processor-capable platforms, such as hand-held processing devices (such as smart phones, tablet computers, personal digital assistants (PDAs), or personal computing devices (PCDs), for example. In some examples, hardware may include any physical device that is capable of storing machine-readable instructions, such as memory or other data storage devices. In some examples, other forms of hardware include hardware sub-systems, including transfer devices such as modems, modem cards, ports, and port cards, for example.

In some examples, software includes any machine code stored in any memory medium, such as RAM or ROM, and machine code stored on other devices (such as floppy disks, flash memory, or a CD ROM, for example). In some examples, software may include source or object code. In several exemplary embodiments, software encompasses any set of instructions capable of being executed on a computing device such as, for example, on a client machine or server.

In some examples, combinations of software and hardware could also be used for providing enhanced functionality and performance for certain embodiments of the present disclosure. In some examples, software functions may be directly manufactured into an integrated circuit. Accordingly, it should be understood that combinations of hardware and software are also included within the definition of a computer system and are thus envisioned by the present disclosure as possible equivalent structures and equivalent methods.

In some examples, computer readable mediums include, for example, passive data storage, such as a random access memory (RAM) as well as semi-permanent data storage such as a solid state drive. One or more exemplary embodiments of the present disclosure may be embodied in the RAM of a computing device to transform a standard computer into a new specific computing machine. In some examples, data structures are defined organizations of data that may enable an embodiment of the present disclosure. In an exemplary embodiment, a data structure may provide an organization of data, or an organization of executable code.

In some examples, a network and/or one or more portions thereof may be designed to work on any specific architecture. In some examples, one or more portions of the network may be executed on a single computer, local area networks, client-server networks, wide area networks, internets, hand-held and other portable and wireless devices and networks.

In some examples, a database may be any standard or proprietary database software, such as Oracle, Microsoft Access, SyBase, or DBase II, for example. The database may have fields, records, data, and other database elements that may be associated through database specific software. In several exemplary embodiments, data may be mapped. In some examples, mapping is the process of associating one data entry with another data entry. In an exemplary embodiment, the data contained in the location of a character file can be mapped to a field in a second table. In some examples, the physical location of the database is not limiting, and the database may be distributed. In some examples, the database may exist remotely from the server, and run on a separate platform. In some examples, the database may be accessible across the Internet. In several exemplary embodiments, more than one database may be implemented.

In some examples, a computer program, such as a plurality of instructions stored on a computer readable medium, such as the computer readable medium, the system memory 504, and/or any combination thereof, may be executed by a processor 502 to cause the processor 502 to carry out or implement in whole or in part the operation of the computing system 500, one or more of the methods. In some examples, such a processor 502 may execute the plurality of instructions in connection with a virtual computer system.

Some examples of processing systems described herein may include non-transitory, tangible, machine readable media that include executable code that when run by one or more processors (e.g., processor 502) may cause the one or more processors to perform the processes of methods as described above. Some common forms of machine readable media that may include the processes of methods for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method performed by a computing system, the method comprising:
   with a computing system, receiving an application and a security policy corresponding to the application, the security policy for use with a security enforcement mechanism;
   with the computing system, receiving a data structure associated with the application and the security policy, wherein the data structure associates a logged denial by the security enforcement mechanism with a rule of the security policy, wherein the data structure further associates the logged denial with a test for the rule, the test to determine if the rule prevents the denial;

with the computing system, applying the test using a temporary security policy, the temporary security policy having the rule removed; and with the computing system, in response to determining that the applying does not result in a denial corresponding to the logged denial, flagging the data structure.

2. The method of claim 1, wherein to create the data structure, the method further comprises:

during development of the application, running the application with the security policy on a system that uses the security enforcement mechanism;

in response to determining that the application causes a denial, creating the rule for the security policy to prevent the denial and creating the test to determine whether running the application with the rule causes the denial; and placing the denial, the rule, and the test in the data structure.

3. The method of claim 1, wherein to create the data structure, the method further comprises:

after development of the application, determining a plurality of rules from the security policy; and determining a plurality of tests, each of the plurality of tests corresponding to one of the plurality of rules;

wherein the test of the data structure is one of the plurality of tests and the rule of the data structure is one of the plurality of rules corresponding to the one of the plurality of tests.

4. The method of claim 3, wherein the plurality of rules comprise rules of a type deemed to be a greater security risk than other types of rules.

5. The method of claim 1, wherein the data structure comprises a tuple of a database, the database associating denials with corresponding rules and corresponding tests.

6. The method of claim 5, further comprising, for each tuple in the database:

applying the test of that tuple using a temporary security policy, the temporary security policy having the rule of that tuple disabled; and in response to determining that the applying the test of that tuple does not result in a denial corresponding to the logged denial of that tuple, flagging the rule of that tuple for investigation.

7. The method of claim 1, further comprising, in response to determining that the applying does result in a denial corresponding to the logged denial, maintaining the rule.

8. The method of claim 1, further comprising, for a flagged rule:

verifying the test; and in response to creating a revised test, applying the revised test using the temporary security policy.

9. The method of claim 1, further comprising, for a flagged rule, opening a ticket in a bugtracker for the application, the security policy, and the rule.

10. The method of claim 1, further comprising, removing the flagged rule.

11. The method of claim 1, wherein the security policy enforcement mechanism comprises Security-Enhanced Linux (SELinux).

12. The method of claim 11, wherein the logged denial comprises an Access Vector Cache (AVC) denial.

13. A method comprising:

with a computing system, receiving an application and a security policy corresponding to the application, the security policy for use with a security enforcement mechanism;

with the computing system, receiving a data structure associated with the application and the security policy, the data structure comprising a set of tuples, each tuple associating a logged denial by the security enforcement mechanism with a rule of the security policy that caused that denial and a test for the rule;

with the computing system, for each tuple, applying the test of that tuple using a temporary security policy, the temporary security policy having the rule of that tuple removed; and with the computing system, in response to determining that the applying does not result in a denial corresponding to the logged denial of that tuple, flagging the tuple; and with the computing system, removing the tuple without removing unflagged tuples.

14. The method of claim 13, wherein the data structure is created during development of the application.

15. The method of claim 13, wherein the data structure is created after development of the application.

16. The method of claim 13, further comprising, for a flagged rule:

creating a revised test for the rule; and applying the revised test using the temporary security policy.

17. The method of claim 16, further comprising, removing the flagged rule from the security policy.

18. A method performed by a computing system, the method comprising:

with a computing system, during a testing phase for development of an application, running the application with a security policy on a system that uses a security enforcement mechanism;

with the computing system, in response to determining that the application causes a denial, creating a data structure that associates the denial with the rule intended to prevent the denial and a test used to determine if the rule prevents the denial;

with the computing system, after the testing phase, applying the test using a temporary security policy, the temporary security policy having the rule disabled; and with the computing system, in response to determining that the applying does not result in a new denial corresponding to the denial, flagging the information within the data structure;

with the computing system, in response to flagging the information within the data structure, removing the flagged information without removing information that is not flagged.

19. The method of claim 18, wherein the test causes the application to execute portions of code that caused the denial to determine whether the rule prevents the denial.

20. The method of claim 18, wherein the rule is an allow rule that allows an operation that caused the denial.

* * * * *